United States Patent [19]
Langenohl et al.

[11] Patent Number: 5,512,325
[45] Date of Patent: Apr. 30, 1996

[54] NON-SLUMPING, PUMPABLE CASTABLE AND METHOD OF APPLYING THE SAME

[75] Inventors: Mark C. Langenohl, Pittsburgh; Gustav O. Hughes, Wilkensburg, both of Pa.

[73] Assignee: Indresco Inc., Dallas, Tex.

[21] Appl. No.: 420,912

[22] Filed: Apr. 12, 1995

Related U.S. Application Data

[62] Division of Ser. No. 330,759, Oct. 28, 1994.

[51] Int. Cl.$^6$ .......................................... B05D 1/02
[52] U.S. Cl. .............................................. 427/421; 427/427
[58] Field of Search .......................... 501/124; 106/692, 106/693, 694; 427/427, 421, 419.7

[56] References Cited

U.S. PATENT DOCUMENTS

| | | |
|---|---|---|
| 3,802,894 | 4/1974 | Prost . |
| 3,817,770 | 6/1974 | Dunworth . |
| 3,973,978 | 8/1976 | Nakagawa et al. . |
| 4,082,561 | 4/1978 | Nakagawa et al. . |
| 4,357,167 | 11/1982 | Kellet et al. . |
| 4,623,393 | 11/1986 | Toda et al. . |
| 4,904,503 | 2/1990 | Hilton et al. ............................ 427/373 |
| 4,943,544 | 7/1990 | McGarry et al. . |
| 4,981,731 | 1/1991 | Yorita et al. . |
| 5,098,873 | 3/1992 | Edwards et al. . |
| 5,269,845 | 12/1993 | Grunau et al. . |

FOREIGN PATENT DOCUMENTS

| | | |
|---|---|---|
| 2059789 | 6/1971 | France . |
| 2166130 | 4/1986 | United Kingdom . |

*Primary Examiner*—Paul Marcantoni
*Attorney, Agent, or Firm*—John L. Sigalos

[57] ABSTRACT

An essentially non-slumping, high density, low moisture and low cement castable composition, consisting of a tempered, pumpable first component containing the castable solids and consisting essentially of a refractory aggregate, a calcium-aluminate cement, a flow aid, a deflocculating agent, and water, the water being present in the lowest amount sufficient to achieve a pumpable consistency of the tempered first component, and a flocculating agent as a second component to be added to said first component at time of installation in an amount sufficient to give the castable a dried bulk density of at least about 120 pcf. The invention also includes the method of applying such castable through a spray nozzle in which the flocculating agent is added to the tempered first component just prior to its application through a spray nozzle.

7 Claims, No Drawings

NON-SLUMPING, PUMPABLE CASTABLE AND METHOD OF APPLYING THE SAME

This application is a division of application Ser. No. 08/330,759, filed Oct. 28 1994, now pending.

BACKGROUND OF THE INVENTION

The present invention relates to novel non-slumping, pumpable castables containing calcium-aluminate cement, and to the method of applying the same without the utilization of forms.

The use of wet gunning mixes and systems and shotcreting systems are old and well-known procedures. For example, shotcreting of Portland cement based concretes comprises forming a mix containing sand, gravel, and a Portland cement and tempering with water to a pumpable consistency. This concrete is then placed through a swing valve concrete pump and conducted to a nozzle where a cement set accelerator and air are added to blow the material onto a surface where it stiffens rapidly enough so as not to slump off the surface to which it is applied, such as a wall. This stiffening reaction is a result of the chemical accelerator reacting with Portland cement to rapidly begin a setting action, which quickly raises the viscosity of such concrete to a level high enough to prevent slumping. Approximately 3 to 6 wt. % accelerator, for each 100 wt. % of dry mix, is required to reach the desired stiffness. Accelerators cause hydration reactions that stiffen the cement.

However, while this is suitable for many uses, refractory concretes are not satisfactorily used with Portland cements as a binder, because they cannot withstand the high temperatures and corrosive environments in which refractory materials are placed. Thus, a large majority of refractory concretes, also known as refractory castables, contain calcium-aluminate cement instead of Portland cements. Calcium-aluminate cements have a much higher melting temperature, much higher refractoriness, and higher corrosion-resistance to the environment seen in high temperature refractory applications. Such high temperature refractory applications can range from boiler ash hoppers to steel ladles.

However, calcium-aluminate cements have very different hydration reactions compared to Portland cement, so that additives used, for example, in the shotcreting of Portland cement concrete do not work well in refractory castables with like amounts of calcium-aluminate cement. As a consequence, at the present time there is not commercially available any refractory shotcrete composition. Moreover, while calcium-aluminate cement is vastly superior to Portland cement in its ability to withstand, as noted, high temperatures and corrosive environments, it is still not able to withstand such environments as well as typical refractory grains, such as high purity alumina, andalusite, calcined alumina-silica or amorphous silica grains. The calcium-aluminate cement, therefore, remains the weak link in the refractory castable.

By virtue of this fact, refractory companies have developed castable systems that use very low amounts of calcium-aluminate cement. This is possible by using chemicals that reduce the amount of water needed to bring the castable to a consistency that it can be installed, the use of sub-micron particles as flow aids, and the careful control of the particle size distribution to further lower the amount of water needed to achieve suitable pumpable consistency and to increase the amount of grain to grain contact to keep the strengths high.

These low calcium-aluminate cement castables have found uses in a variety of applications over the past decades where previously only pressed brick could be utilized. Such applications vary from steel ladles to aluminum melting furnaces. The savings realized by the use of casting compared to the laying and mortaring of brick are quite high in terms of labor costs and time. However, all of the cost savings cannot be realized, because forms are needed to place these castables into a suitable lining and such preparation, installation, and removal of such forms is in itself a costly procedure, not only in terms of time but also in terms of labor to install and remove the same after the refractory has hardened.

In an effort to overcome these problems, gunite materials have been utilized and are placed into position by pneumatically conveying the dry material through a hose to a nozzle where water is added. This method, however, gives inferior properties compared to casting and has the added disadvantage of producing rebounds and a significant amount of dust. Rebounds consist of the material that does not stick to the target wall or ceiling and bounces onto the floor. Efforts to reduce dust and to eliminate rebounds, such as by the addition of granular or powdered calcium chloride to a relatively high calcium-aluminate cement systems still do not achieve suitable castables, particularly in terms of the physical properties needed.

Another procedure to overcome the problems with guniting has been the addition of accelerators, such as aluminum sulfate or gypsum, at the nozzle of a conventional guniting system in order to accelerate the cure of the cement and to prevent slumping. Such systems heretofore have been all lightweight mixes, which initially reduces their tendency to slump, and while useful in some applications, it does eliminate a great deal of the rebounding and dust, and it is not suitable for refractory vessels such as steel or iron ladles, and the like, which are exposed to highly destructive environments and require dense strong products which cannot be made utilizing such accelerators. In like manner, other techniques have been utilized in an effort to eliminate the cumbersome equipment required by many of the procedures, some of which require multiple components and no satisfactory procedure or composition has yet been found to be able to install a low cement, low moisture non-slumping calcium-aluminate cement-containing pumpable castable.

SUMMARY OF THE INVENTION

The present invention overcomes the problems of the prior art and provides a low calcium-aluminate cement-containing castable which is non-slumping and which can be applied without forms, in which all of the solid components can be supplied to the installer in a single component. It eliminates the problems of rebounding and dust, while at the same time has the necessary physical properties, such as strength and corrosion resistance, to withstand the harsh environments present in refractory vessels such as steel ladles, and the like.

Briefly, the present invention comprises a low cement castable consisting of a tempered pumpable first component containing all of the castable solids and consisting essentially of a refractory aggregate, calcium-aluminate cement, a flow aid, and a deflocculating agent, together with water in an amount sufficient to achieve a pumpable consistency, and as a second additive a flocculating agent to be added to said first component at the time of installation in an amount sufficient to give a bulk density of at least about 120 pcf.

The invention also comprises the method of applying such refractory castable as is hereinafter more fully described.

DETAILED DESCRIPTION

The present low cement castable has all of the essential dry materials as a first component, which is tempered. That is to say, it consists essentially of a refractory aggregate, a calcium-aluminate cement, a flow aid, a deflocculating agent, and water in an amount sufficient to achieve the necessary pumpable consistency.

The refractory aggregate utilized can be any suitable for linings for metallurgical vessels, such as calcined fire clay, crude and calcined kyanite, crude and calcined andalusite, calcined bauxite and bauxitic kaolins, sintered alumina, fused alumina and bauxites, silicon carbides, zircons, zirconia, vitreous or fused silica, combinations thereof, and other like refractory aggregates.

Combinations of bauxite and calcined alumina-silica grains would give the most economical benefits for most applications. Other refractory aggregates that may be used include magnesia, magnesia-alumina spinel, chrome ore, and chromic oxide.

As used herein, the term "low cement castable" means a castable containing a hydraulic setting cement, such as a calcium-aluminate cement, in which the total CaO content of the castable ranges from about 1 to 2.5%. Any calcium-aluminate cement can be utilized, but it is important to limit the amount thereof, preferably to an amount no higher than about 15%. Any of the calcium-aluminate cements commonly used in refractory compositions can be utilized for this purpose. However, it is preferred to use high purity calcium aluminate cements which contain virtually only calcium aluminate phases and alumina without any rheology additives, such as dispersants. These are usually commercially available as 70% alumina and 30% calcia cements with Alcoa's CA-14 and Lafarge's SECAR 71 being examples.

As to the flow aids, any conventional materials used with pulverulent refractory mixes can be used, such as microsilica, 1 to 3 micron alumina, or mixtures thereof. With respect to the deflocculating agents, these are also commonly referred to as "wetting" agents and these can include phosphates such as sodium tripolyphosphate or sodium hexa-meta phosphate.

Ball clay can be added for its ability to function as a plasticizer and it is often desired to utilize both the conventional deflocculating agents, such as one of the phosphates, together with a plastic clay such as ball clay. Plasticizers such as bentonites and known organic plasticizers can also be used, but in lesser amounts than the ball clay.

This first component is designed to produce a low moisture castable composition such that it can be readily pumped at a reduced water level as compared to conventional high cement castables. The castable of the instant invention is easily pumped at 6.5 to 7.5% water.

As to the amount of water used, it is added in the lowest amount sufficient to achieve a pumpable consistency suitable for use with swing valve pumps and the associated spray nozzles utilized therewith. Such swing valve concrete pumps are conventional and well known, and are ordinarily connected through a steel pipe and/or hose to a nozzle arrangement. Such nozzle arrangement has an air line hookup where air is fed to the nozzle in order to take the pumpable composition into a form such that it is sprayed onto the surface to be lined with the refractory material.

A further aspect of the instant invention is the addition, preferably through such air line, of a liquid flocculating agent to the nozzle to be admixed with the tempered composition just as it is sprayed onto the surface of the vessel. If desired, the liquid flocculating agent can be added by means of any conventional pump and a "Y" interconnect to the air line, so that the flocculating agent can be added at the proper rate directly to the composition at the nozzle.

As to the flocculating agent utilized, it is preferred to use a calcium chloride solution or a solution of dipotassium phosphate, with calcium chloride solutions having been found to be most effective. Other alkali chlorides, such as magnesium chloride, and alkali phosphates can also be utilized. The purpose of this flocculating agent is to "overpower" or eliminate the effect of the deflocculating or wetting agent placed in with the dry mixture in making the tempered castable. It acts, in effect, to turn the low moisture castable instantly into a viscous plastic mass, making it sticky enough at its existing low water level to be sprayed onto a wall without slumping and without the need for forms. The flocculating agent reacts with all composition particles, i.e., cements, aluminas, silicas, etc. causing them to agglomerate.

The amount of flocculating agent is critical since it can adversely affect the desired bulk density of the castable. Bulk density is considered the most important physical property for a refractory castable, in that all other important properties such as strength and corrosion resistance are directly proportional to the density of any given castable composition. Thus, as density decreases, strength and corrosion resistance also decrease. With the castables of the present invention, the bulk density should be at least 120 pcf, preferably, 130 to 145 pcf. The amount of flocculating agent added, as hereinafter described, must therefore be carefully controlled.

This unique composition has made the method of its application highly unusual and enabled several very large and significant advantages. First, because the mix is fully tempered at the mixer before it goes to the pump, dust at the nozzle is extremely minimal, if any at all. This is in contrast to conventional refractory guniting that is not fully tempered before it is conveyed and, therefore, creates a significant amount of dust at the nozzle. Further, swing valve pumps are very efficient ways of moving material. Even a small swing valve pump can install material at a faster rate than conventional gunite or spraying of refractories. Rates of 15 to 20 tons per hour are easily obtained through a swing valve pump compared to only four to five tons per hour through conventional guniting apparatus. Further, rebounds with respect to the instant composition are very minor compared to guniting because, as noted, the non-slumping, castable of the instant invention is fully tempered before being pumped through the nozzle. Lastly, the physical properties of the castable herein are vastly superior to conventional guniting properties or to conventional spray mixes.

Most importantly, the instant castable can be applied without the need to install forms to maintain it in place until it has sufficiently cured so it will not slump and, of course, this avoids the cost of installing and removing such forms due to labor and time.

While not required, it is possible to add to the base mix steel fibers for structural integrity and organic fibers, such as polyvinyl chloride, polyethylene, or polypropylene fibers, to help dry out the mass when the applied castable is being heated. The additives are used for their usual effect and in conventional amounts. Thus, the fibers are added in amounts from about 0.05 to 5 wt. % of the base mix to help strengthen the cured castable lining.

As to proportions, for each 100 wt. % of the untempered castable, there can be used from about 75 to 95 wt. % of the refractory aggregate, 2 to 15 wt. of the calcium-aluminate cement, 3 to 10 wt. % of the flow aid, 0.05 to 0.3 wt. % of a deflocculating agent, and 0 to 5% of ball clay. Optimally, there should be 5 to 9 wt. % of the cement, 5 to 9 wt. % of the flow aid, 0.1 to 0.25 wt. % of the deflocculating agent, and the balance the refractory aggregate.

It is especially preferred to use no more than about 9% of the calcium-aluminate cement.

A preferred composition is one containing 83.8 wt. % of the refractory aggregate, 7 wt. % of the cement, 7 wt. % microsilica, 2 wt. % ball clay, and 0.2 wt. % deflocculating agent.

With respect to the flocculating agent which is added just prior to casting, for each 100 wt. % of the tempered castable, it is preferred to add from about 0.1 to 2.5 wt. % of a 25 to 70% solution of dipotassium phosphate, or 25 to 60% solution of a calcium chloride to achieve a bulk density of at least about 120 pcf. Higher and lower concentrations of the flocculating agent can be utilized, depending on the particulars of the dry components of the castable used, concentration of the flocculating agent, and particular flocculating agent. The most optimum concentration for any given composition can be determined by routine experimentation as shown in Example 5 below.

As will be evident to those skilled in this art, the liquid pump by which the flocculating agents is fed to the nozzle must have the capacity to match the swing valve pump at its given material output, and must be able to generate enough pressure to overcome the air pressure in the line, which is ordinarily about 50 to 100 psi. All of this is conventional and readily known to those skilled in this art.

With respect to the amount of water added in order to have the satisfactory tempered mix; that is, to have an adequate pump cast consistency, the amount will vary, dependent mainly upon the particular components in the mix, the particular swing valve pump utilized, the length of hose by which it is supplied, and the air pressure. These are all readily calculable by those skilled in this art. In the examples that follow, the amount of water added to properly temper the same to obtain a proper pump cast consistency, is such that it could be run through a swing valve pump and through 25 to 200 feet of a heavy duty hose or pipe, and placed on the wall utilizing 80 psi air pressure.

The invention will be further described in connection with the following examples which are set forth for purposes of illustration only and in which proportions are in wt. % unless expressly stated to the contrary.

EXAMPLES 1 AND 2

An Allentown AP-10 swing valve piston pump and a 500 psi diaphragm chemical pump to "move" the flocculating agent were used. In this case, 1 wt. % of a 50% dipotassium-phosphate solution was used as the flocculating agent. A 350 cfm air compressor was used as the source of the air feed and air was injected into the nozzle at 80 psi pressure. Samples were tested by spraying them into a shot box then cutting samples on a diamond saw after curing. ASTM procedures, where applicable, were used to determine properties. For Example 1, the tempered component has the following formulation:

|  | Wt. % |
|---|---|
| Calcined 60% Alumina Grain, −3 mesh | 76.8 |
| Calcined Alumina, −325 mesh | 7 |
| Microsilica | 7 |
| Calcium-Aluminate Cement | 7 |
| Ball Clay | 2 |
| Sodium Tripolyphosphate | 0.2 |
| Plus Additions | 0.15 |
| PVC Fibers | |
| Water to Achieve a Pump Cast Consistency, * | 7.0 |

The application rate and test results are as follows:

|  |  |
|---|---|
| Pump Feed Rate (Measured): | 550 lbs/min |
| Chemical Pump Feed Rate: | 0.30 Gal/min |
| Bulk Density, pcf | 147 |
| After Drying at 230° F. Modulus of Rupture, psi | |
| After Drying at 230° F. | 1550 |
| After Heating to 1500° F. | 1220 |
| Cold Crushing Strength, psi | |
| After Drying at 230° F. | 7060 |
| After Heating to 1500° F. | 5530 |
| Dimensional Change From Dry Size After Heating to 3000° | |
| % Linear | +0.6 |
| % Volume | +0.8 |

These properties are comparable to similar castables with the density of a similar low cement castable being about 149 pcf and the dried modulus of rupture about 1900 psi. The chemistry of this mix would be classified under ASTM specifications as a 60% alumina low cement castable.

Similar properties were generated on a 70% alumina low cement castable as listed below. In this case, 0.4 wt. % of a 32% calcium chloride solution was used as the flocculating agent. For Example 2, the castable formulation and test properties were as follows:

|  | Wt. % |
|---|---|
| Calcined 70% Alumina Grain, −3/+100 mesh | 62.8 |
| Calcined Bauxite, BMF, −100 mesh | 14 |
| Calcined Alumina, −325 mesh | 7 |
| Microsilica (Submicron) | 7 |
| Calcium-Aluminate 71 Cement | 7 |
| Ball Clay | 2 |
| Sodium Tripolyphosphate | 0.2 |
| Plus Addition | 0.15 |
| PVC Fibers | |
| Water to Temper, % | 7.5 |
| Pump Feed Rate (Measured) | 570 lbs/min |
| Chemical Pump Rate | 0.2 Gal/min |
| Bulk Density, pcf | 147 |
| After Drying at 230° F. Modulus of Rupture, psi | |
| After Drying at 230° F. | 1430 |
| After Heating to 1500° F. | 1250 |
| Cold Crushing Strength, psi | |
| After Drying to 230° F. | 6620 |
| After Heating to 1500° F. | 5290 |
| Dimensional Change from Dry Size After Heating to 3000° F. | |
| % Linear | +2.0 |
| % Volume | +4.6 |

EXAMPLES 3 AND 4

The properties of the instant castables compare quite well with the properties of an existing low cement castable that is pump cast into forms. The major advantage of the instant method compared to pump casting is that it is formless. Not having to set up and remove forms can represent hundreds of thousands of dollars in reduced down time for certain applications like catalytic crackers in a petrochemical plant. The existing method of installing material without forms is refractory guniting. As can be seen in these examples, these do not have as good properties, particularly in the maximum service temperature which is limited by the high cement needed to achieve a sticky mix and the high strengths required by these products. The material claimed in this invention also has the added advantages over the gunite material in that it creates much less dust at the nozzle, rebounds are much lower, and because the material is pumped by positive displacement, instead of pneumatically, up to 5 times as much material can be placed in a given time frame.

| EXISTING 60% ALUMINA LOW CEMENT CASTABLE PUMP CAST PROPERTIES | |
|---|---|
| Maximum Service Temperature | 3,100° F. |
| Bulk Density, pcf | 150 |
| After Drying at 230° F. | |
| Modulus of Rupture, psi | |
| After Drying at 230° F. | 1,550 |
| After Heating to 1500° F. | 2,550 |
| Crushing Strength, psi | |
| After Drying at 230° F. | 16,480 |
| After Heating to 1500° F. | 9,200 |
| Permanent Linear Change, % | |
| After Heating to 1500° F. | −0.2 |
| After Heating to 3000° F. | −1.1 |

| EXISTING 60% ALUMINA GUNITE MIX GUNNED PROPERTIES | |
|---|---|
| Maximum Service Temperature | 3100° F. |
| Bulk Density, pcf | 137 |
| After Drying at 230° F. | |
| Modulus of Rupture, psi | |
| After Drying at 230° F. | 1,340 |
| After Heating at 1500° F. | 1,030 |
| Crushing Strength, psi | |
| After Heating at 230° F. | 6,000 |
| After Heating to 1500° F. | 5,000 |
| Permanent Dimensional Change | −0.2 |
| After Heating to 2700° F. | |
| % Linear | |

EXAMPLE 5

To illustrate the criticality in the amount of flocculating agent used, a series of tests were carried out using the mix of Example 2 and adding thereto a 32% calcium chloride solution in various amounts and then measuring the bulk density of the applied castable after drying at 230° F.

| Wt. % of a 33% $CaCl_2$ Solution as Percentage Density of dry batch | Applied Castable Density (In pcf) |
|---|---|
| 0.41% | 142 |
| 0.48 | 129 |
| 0.67 | 130 |
| 0.68 | 139 |
| 0.75 | 133 |
| 0.65 | 122 |
| 1.14 | 124 |
| 1.21 | 117 |

It will be seen that for this composition and concentration of calcium chloride, amounts above about 1.2 wt. % of calcium chloride are not suitable since they drastically decrease the density. An amount of 0.8 wt. % or less should preferably be used.

It has been noted that dipotassium phosphate is a less effective flocculating agent and can be used in slightly higher percentages again, with care taken not to add an amount such as to lower the bulk density below about 120 pcf.

These examples demonstrate that the instant invention is a desirable method of installing low cement, low moisture castables. In fact, bench scale and spraying studies have indicated that any low moisture, low cement castable containing a strong deflocculating agent that can be tempered to a pumping consistency can be utilized in this method. This includes mixes made with fireclay grain, vitreous silica grain, and bauxite grain. It has also been shown that mixes made with lower cement, down to 3%, and higher cement, up to 15% can also be installed using this method as long as they are designed in a highly deflocculated system.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method of applying a low moisture, low cement refractory castable to a refractory vessel with a swing valve pump and associated spray nozzle, without the use of forms comprising preparing a tempered pumpable first component consisting essentially of a refractory aggregate, a calcium-aluminate cement, a solid flow aid, and a deflocculating agent and water in the lowest amounts sufficient to achieve a consistency sufficient to enable the composition to be pumped and applied through said swing valve pump and spray nozzle, adding a flocculating agent to said composition just prior to its application through said spray nozzle in an amount sufficient to give the castable a dried bulk density of at least about 120 pcf, and then applying the composition to the refractory vessel without the use of forms.

2. The method of claim 1, wherein the tempered pumpable composition contains a plasticizer.

3. The method of claim 1, wherein the proportion of castable solids for each 100 wt. % at said first component is about 75 to 95 wt. % refractory aggregate, 2 to 15 wt. % calcium-aluminate cement, 3 to 10 wt. % flow aid, and 0.05 to 0.3 wt. % deflocculating agent.

4. The method of claim 3 including up to 5 wt. % of a plasticizer.

5. The method of claim 4, wherein the amount of flocculating agent added, for each 100 wt. % of said first component castable solids is from about 0.1 to 2.5 wt. %.

6. The method of claim 5, wherein the flocculating agent is an alkali chloride or alkali phosphate.

7. The method of claim 6, wherein the calcium-aluminate cement consists essentially of about 70 wt. % alumina and 30 wt. % calcia, the flow aid is a microsilica, the deflocculating agent is sodium tripolyphosphate, the plasticizer is a ball clay, and the flocculating agent is calcium chloride or dipotassium phosphate.

* * * * *